United States Patent
Hu et al.

(10) Patent No.: US 9,736,423 B2
(45) Date of Patent: Aug. 15, 2017

(54) METHOD AND APPARATUS FOR EXTRACTING SURVEILLANCE RECORDING VIDEOS

(71) Applicant: HANGZHOU HIKVISION DIGITAL TECHNOLOGY CO., LTD., Hangzhou, Zhejiang (CN)

(72) Inventors: Jingxiang Hu, Zhejiang (CN); Furong Lin, Zhejiang (CN); Junshu Zhao, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 15/109,756

(22) PCT Filed: Aug. 13, 2014

(86) PCT No.: PCT/CN2014/084295
§ 371 (c)(1),
(2) Date: Jul. 5, 2016

(87) PCT Pub. No.: WO2015/101047
PCT Pub. Date: Jul. 9, 2015

(65) Prior Publication Data
US 2016/0323535 A1    Nov. 3, 2016

(30) Foreign Application Priority Data
Jan. 3, 2014  (CN) .......................... 2014 1 0005931

(51) Int. Cl.
*H04N 5/77* (2006.01)
*H04N 5/91* (2006.01)
(Continued)

(52) U.S. Cl.
CPC ......... *H04N 5/77* (2013.01); *G06F 17/30817* (2013.01); *G06F 17/30831* (2013.01);
(Continued)

(58) Field of Classification Search
USPC ................. 386/223, 224, 226, 227, 229, 248
See application file for complete search history.

(56) References Cited

U.S. PATENT DOCUMENTS 8,992,227 B2 *   3/2015   Al Bandar ............. A61B 5/164
                                                             434/236
2015/0379355 A1 * 12/2015   Kanga .............. G08B 13/19671
                                                             382/103

FOREIGN PATENT DOCUMENTS

CN    101883261    11/2010
CN    102685460     9/2012
(Continued)

OTHER PUBLICATIONS

International Search Report for international application No. PCT/CN2014/084295, dated Nov. 19, 2014 (4 pages, including English translation).

*Primary Examiner* — Robert Chevalier
(74) *Attorney, Agent, or Firm* — Hamre, Schumann, Mueller & Larson, P.C.

(57) ABSTRACT

The present invention relates to the field of video surveillance. Disclosed are a method and device for extracting surveillance record videos. In the present invention, the method for extracting surveillance record videos comprises the following steps: acquiring and storing lens viewsheds of cameras and an irradiation time period corresponding to each lens viewshed; extracting lens viewsheds corresponding to irradiation time periods that have intersection relationships with a query time period; calculating intersection relationships between the extracted lens viewsheds and a target location; obtaining a set of cameras corresponding to (Continued)

lens viewsheds that have intersection relationships with the target location; and extracting videos captured by the cameras according to irradiation time periods of the cameras in the camera set. Cameras relevant to the target can be found through intersection calculation performed on a designated target location in a designated time period of the user and selected camera viewsheds, so as to directly extract from the relevant cameras videos meeting conditions and useful for the practical application, thereby reducing the labor and time consumed in manual checking of video records.

10 Claims, 9 Drawing Sheets

(51) Int. Cl.
*G06F 17/30* (2006.01)
*G08B 13/196* (2006.01)
*H04N 5/247* (2006.01)
*H04N 7/18* (2006.01)
*G06K 9/00* (2006.01)
*H04N 5/232* (2006.01)

(52) U.S. Cl.
CPC ....... *G06K 9/00771* (2013.01); *G08B 13/196* (2013.01); *G08B 13/19645* (2013.01); *G08B 13/19671* (2013.01); *G08B 13/19682* (2013.01); *H04N 5/247* (2013.01); *H04N 5/91* (2013.01); *H04N 7/181* (2013.01); *H04N 5/23216* (2013.01)

(56) References Cited

FOREIGN PATENT DOCUMENTS

| CN | 102929993 | 2/2013 |
| JP | 2004297298 | 10/2004 |

* cited by examiner

METHOD AND APPARATUS FOR EXTRACTING SURVEILLANCE RECORDING VIDEOS

TECHNICAL FIELD

The present disclosure relates to the field of video surveillance, particularly relates to a technology of extracting surveillance recording videos.

BACKGROUND TECHNOLOGY

Lens refers to video surveillance box camera or dome camera, the direction of the box camera is fixed, whereas the direction of the dome camera is not fixed, it can be rotated. The working process of prior method for viewing video points based on the GIS (Geographic Information System) map is as follows:

First, a point or a line or a region is set on the GIS map; then, a region is drawn with the point, the line or the region set at the first step as the center and with a preset radius, and all lenses within this region are found out to form a list; finally, videos from the lenses are displayed on a big screen of a video stitching wall.

This solution performs a search based on the GIS space, which is similar to the peripheral seeking of Baidu map, but the peripheral seeking of Baidu map takes restaurants, banks, hotels etc. as targets, whereas the above solution takes lenses as seeking targets. However, in order to find out the video of a specific event within a specified time period after all lenses within a specified region have been found out by this solution, it needs to view long time periods videos which from the lens that around a criminal site artificially to determine which lenses having shot the criminal region, the criminal site or the walking route of the suspect etc., which often spends a lot of manpower and time costs in the urban areas where video lenses are very dense.

SUMMARY

The purpose of the present disclosure is to provide a method and an apparatus for extracting surveillance recording videos, wherein a camera relevant with a target is found out by performing an intersection calculation on a specified target location and a camera viewshed selected by a user, so that videos which match a condition and are useful to practical application are directly extracted from relevant cameras, which reduces the energy and time consumed when video recordings are artificially checked.

To solve the above technical problems, one embodiment of the present disclosure discloses a method for extracting surveillance recording videos, which includes following steps:

acquiring and storing lens viewsheds of cameras and shooting time periods corresponding to each lens viewshed;

extracting the lens viewsheds corresponding to the shooting time periods which have intersection relations with a query time period;

calculating intersection relations between the extracted lens viewsheds and a target location;

obtaining a set of cameras corresponding to the lens viewsheds which have intersection relations with the target location;

extracting videos shot by cameras according to the shooting time periods of respective cameras in the set of cameras.

Another embodiment of the present disclosure further discloses a method for extracting surveillance recording videos, which includes following steps:

extracting lens viewsheds of respective cameras within a query time period;

calculating intersection relations between the extracted lens viewsheds and a target location;

obtaining a set of cameras corresponding to the lens viewsheds which have intersection relations with the target location;

extracting videos shot within the query time period by respective cameras in the set of cameras.

Another embodiment of the present disclosure further discloses an apparatus for extracting surveillance recording videos, which includes following components:

a first viewshed acquiring component configured to acquire and store lens viewsheds of cameras and shooting time periods corresponding to each lens viewshed;

a first viewshed extracting component configured to extract the lens viewsheds corresponding to the shooting time periods which have intersection relations with a query time period;

an intersection calculating component configured to calculate intersection relations between the extracted lens viewsheds and a target location;

a set obtaining component configured to obtain a set of cameras corresponding to the lens viewsheds which have intersection relations with the target location;

a first video extracting component configured to extract videos shot by cameras according to the shooting time periods of respective cameras in the set of cameras.

Another embodiment of the present disclosure further discloses an apparatus for extracting surveillance recording videos, which includes following components:

a second viewshed extracting component configured to extract lens viewsheds of respective cameras within a query time period;

an intersection calculating component configured to calculate intersection relations between the extracted lens viewsheds and a target location;

a set obtaining component configured to obtain a set of cameras corresponding to the lens viewsheds which have intersection relations with the target location;

a second video extracting component configured to extract videos shot within the query time period by respective cameras in the set of cameras.

Comparing embodiments of the present disclosure with the related arts, the main differences and their effects include:

The cameras relevant with a target can be found out by performing an intersection calculation on a target location specified by a user and a selected camera viewshed, so that videos which match a condition and are useful to practical application are directly extracted from relevant cameras, which reduces the energy and time consumed when video recordings are artificially checked. Meanwhile, as the lens viewshed of camera may vary within a query time period, sub time periods within which a target location is shot and which are shorter than a specified time period can be found out more accurately according to shooting time periods, and videos shot by the camera within the sub time periods are extracted, so that finally extracted recording videos are fewer, which further improves the working efficiency of the staff during criminal investigation for example.

Traditional video surveillance just controls dome camera unidirectionally, and there is no practice of obtaining current directional information from the dome camera reversely and making applications based on the directional information. The present disclosure innovatively provides this reverse using method, and a camera relevant with a target is found out by performing an intersection calculation on a target location specified by a user and a selected camera viewshed, so that videos which match a condition and are useful to practical application are directly extracted from relevant cameras, which greatly reduces the energy and time consumed when video recordings are artificially checked one by one, and improves the working efficiency of the investigators during criminal investigation for example.

Further, taking all shooting regions within the variable range of the camera as the lens viewshed of the camera to be acquired and stored can subtract the calculation process brought by screening lens viewsheds corresponding to different shooting time periods, which reduces the amount of calculation for the entire flow.

DETAILED DESCRIPTION OF EMBODIMENTS

In the following description, many technical details are provided for readers to better understand the application. However, it is understood to those skilled in the art that the technical solution claimed to be protected by those claims of this application can also be realized even without these technical details and not based on various changes and modifications of the following embodiments.

To make the purpose, technical solution and merits of the present disclosure clearer, the following will further describe the embodiments of the present disclosure in detail with reference to the accompanying drawings.

Figure 1:
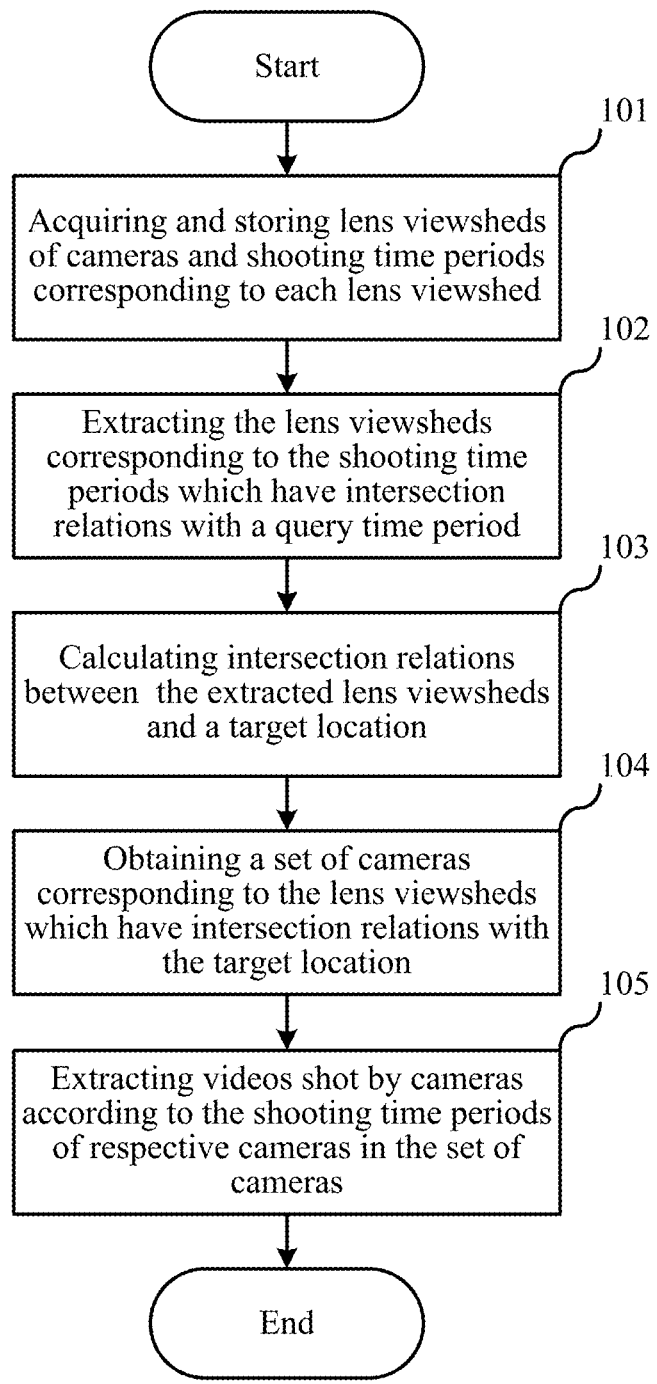
FIG. 1 is a flowchart of a method for extracting surveillance recording videos in the first embodiment of the present disclosure.

The first embodiment of the present disclosure relates to a method for extracting surveillance recording videos. FIG. 1 is a flowchart of the method for extracting surveillance recording videos.

Specifically, as shown in FIG. 1, the method for extracting surveillance recording videos includes following steps:

In step 101, lens viewsheds of cameras and shooting time periods corresponding to each lens viewshed are acquired and stored. Wherein, viewshed refers to a regional scope which a user can see clearly through a lens when the video lens shoots a certain region.

Before this step, the method further includes following step:

a query time period and a target location are obtained from an input device.

In practical application, the target location called in the present disclosure refers to a target point, line or region required to be queried which is selected on an electronic map by a user.

Then proceeds to step 102, the lens viewsheds corresponding to the shooting time periods which have intersection relations with a query time period are extracted.

In other embodiments of the present disclosure, a large query region containing the target location may also be specified previously, the lens viewsheds are first screened according to this query region, and then an extraction for the query time period is performed on the screened lens viewsheds, so as to reduce the amount of calculation.

Then proceeds to step 103, intersection relations between the extracted lens viewsheds and a target location are calculated.

In the present embodiment, calculating the intersection relations in this step is implemented by inputting two graphic objects to an engine of the geographic information system, utilizing spatial calculation ability of the engine and then returning an intersection result of these two graphs by the engine.

Further, it can be understood that in other embodiments of the present disclosure, the method for calculating the intersection relation can be implemented by other ways, not limited to this way.

Then proceeds to step 104, a set of cameras corresponding to the lens viewsheds which have intersection relations with the target location is obtained.

Then proceeds to step 105, videos shot by cameras are extracted according to the shooting time periods of respective cameras in the set of cameras.

Then the flow ends.

The cameras relevant with a target can be found out by performing an intersection calculation on a specified target location and a camera viewshed selected by a user, so that videos which match a condition and are useful to practical application are directly extracted from relevant cameras, which reduces the energy and time consumed when video recordings are artificially checked. Meanwhile, as the lens viewshed of camera may vary within a query time period, sub time periods within which a target location is shot and which are shorter than a specified time period can be found out more accurately according to shooting time periods, and videos shot by the camera within the sub time periods are extracted, so that finally extracted recording videos are fewer, which further improves the working efficiency of the staff during criminal investigation for example.

Figure 2:
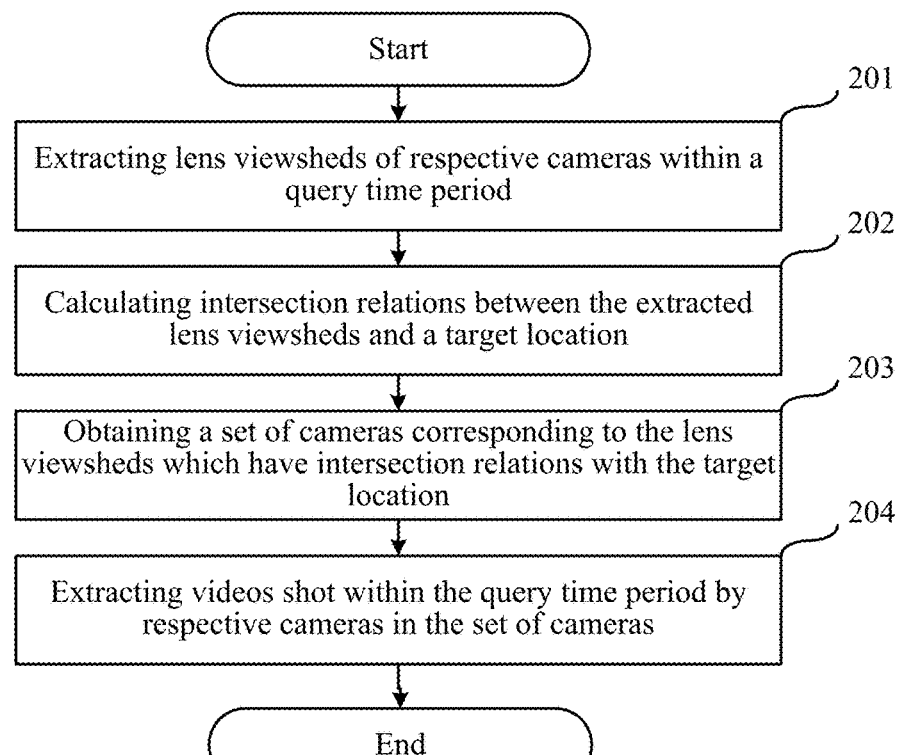
FIG. 2 is a flowchart of a method for extracting surveillance recording videos in the second embodiment of the present disclosure.

The second embodiment of the present disclosure relates to a method for extracting surveillance recording videos. FIG. 2 is a flowchart of the method for extracting surveillance recording videos.

Specifically, as shown in FIG. 2, the method for extracting surveillance recording videos comprises following steps:

In step 201, lens viewsheds of respective cameras within a query time period are extracted.

Before this step, it further comprises following step:
lens viewsheds of cameras are acquired and stored.

In the present embodiment, the acquired and stored lens viewshed refers to all regions which can be shot by a camera corresponding to the lens viewshed within a variable range of the camera. Taking all shooting regions within the variable range of the camera as the lens viewshed of the camera to be acquired and stored can subtract the calculation process brought by screening lens viewsheds corresponding to different shooting time periods, which reduces the amount of calculation for the entire flow.

In other embodiments of the present disclosure, a large query region containing a target location may also be specified previously, the lens viewsheds are first screened according to this query region, and then an extraction for the query time period is performed on the screened lens viewsheds, so as to reduce the amount of calculation.

Then proceeds to step 202, intersection relations between the extracted lens viewsheds and a target location are calculated.

In this step, calculating the intersection relations is implemented by inputting two graphic objects to an engine of the geographic information system, utilizing spatial calculation ability of the engine and then returning an intersection result of these two graphs by the engine.

Further, it can be understood that in other embodiments of the present disclosure, the method for calculating the intersection set can be implemented by other ways, not limited to this way.

Then proceeds to step 203, a set of cameras corresponding to the lens viewsheds which have intersection relations with the target location is obtained.

Then proceeds to step 204, videos shot within the query time period by respective cameras in the set of cameras are extracted.

In the present embodiment, before the step 201, it further comprises following step:
a query time period and a target location are obtained from an input device.

In practical application, target location refers to a target point, line or region required to be queried which is selected on an electronic map by a user.

Traditional video surveillance just controls a dome camera unidirectionally, and there is no practice of obtaining current directional information from the dome camera reversely and making applications based on the directional information. The present disclosure innovatively provides this reverse using method, and the cameras relevant with a target are found out by performing an intersection calculation on a specified target location and a camera viewshed selected by a user, so that videos which match a condition and are useful to practical application are directly extracted from relevant cameras, which greatly reduces the energy and time consumed when video recordings are artificially checked one by one, and improves the working efficiency of the investigators during criminal investigation for example.

Figure 3:
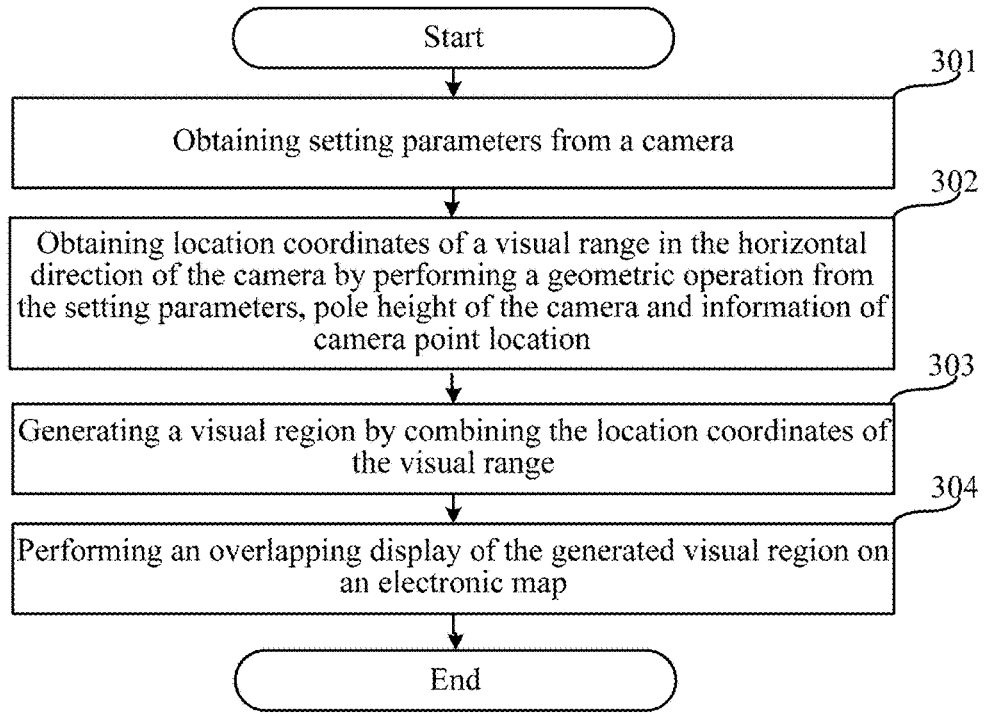
FIG. 3 is a flowchart of a method for acquiring and storing viewsheds in the third embodiment of the present disclosure.

The third embodiment of the present disclosure relates to a method for acquiring and storing viewsheds, and FIG. 3 is a flowchart of the method for acquiring and storing viewsheds.

Specifically, as shown in FIG. 3, the method comprises following steps:

In step 301, setting parameters are obtained from a camera.

When specifically implemented, a viewshed display system may utilize a transmission channel between a camera and a surveillance client to achieve access to the camera; when required, the camera transmits the setting parameters to the viewshed display system via the transmission channel.

Specific content contained in the setting parameters can be selected as required.

Then proceeds to step 302, location coordinates of a visual range in the horizontal direction of the camera are obtained by performing a geometric operation from the setting parameters, pole height of the camera and information of camera point location.

Apart from obtaining setting parameters from a camera, the viewshed display system may also obtain other parameters for performing the operation, and the other parameters include pole height of the camera and information of camera point location, the information of camera point location being location coordinates where the pole of the camera is located; wherein, the pole height of the camera and the information of camera point location may also be uploaded to the viewshed display system by the staff.

Location coordinates of a visual range may specifically be coordinates of respective edge points of a viewshed.

Then proceeds to step 303, a viewshed is generated by combining the location coordinates of the visual range.

Then proceeds to step 304, the generated viewshed is performed an overlapping display on an electronic map.

When overlapped, the viewshed can be significantly marked, such as marked by utilizing a transparent region with colors.

Not only a viewshed but also a blind zone of a camera can be displayed on the electronic map, and specifically, the method comprises:

location coordinates of a blind zone range in the horizontal direction of the camera are obtained by performing a geometric operation from the setting parameters, pole height of the camera and information of camera point location;

a blind zone is generated by combining the location coordinates of the blind zone range;

the generated blind zone is performed an overlapping display on the electronic map.

Figure 4:
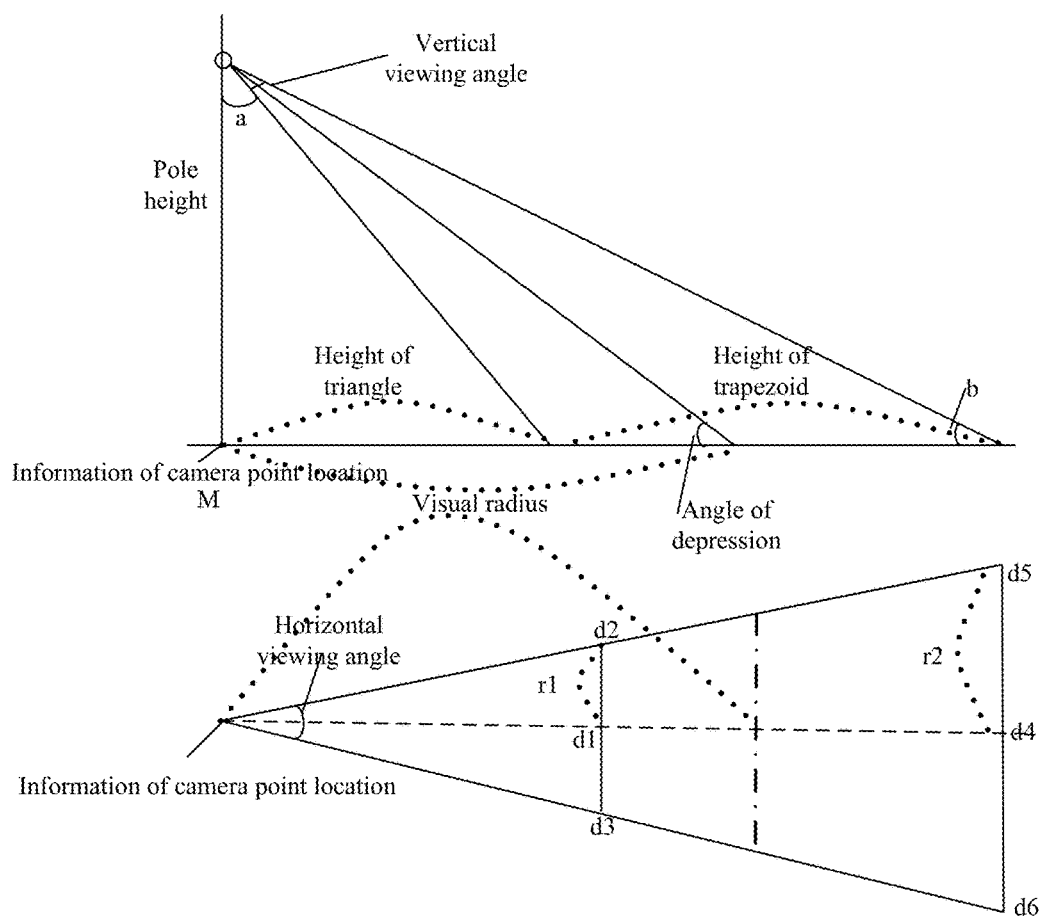
FIG. 4 is an actual location chart for a camera to acquire video data in the third embodiment of the present disclosure.
Figure 5:
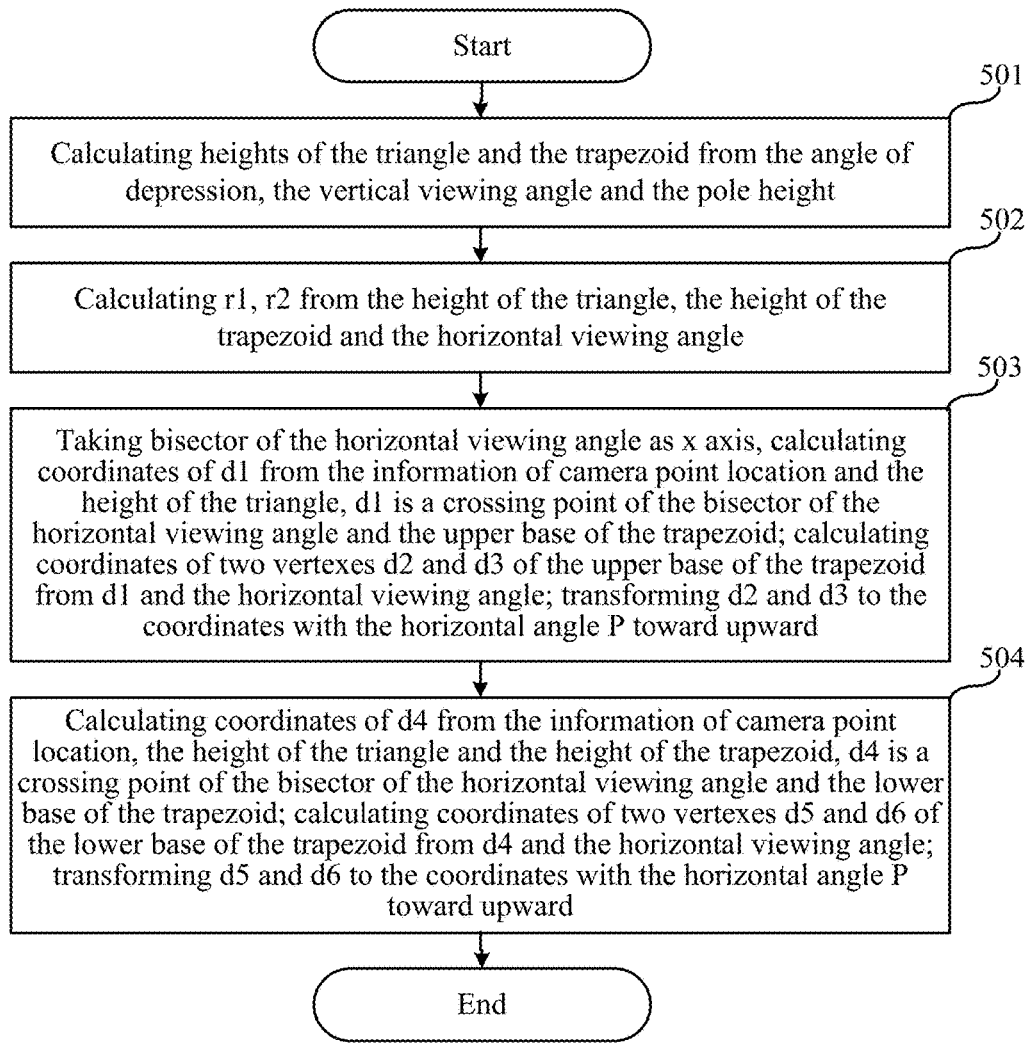
FIG. 5 is a flowchart of calculating location coordinates of a viewshed in the third embodiment of the present disclosure.

In the above flow, after the setting parameters, the pole height of the camera and the information of camera point location are obtained, location coordinates of the visual range and the blind zone range in the horizontal direction of the camera can be obtained by performing a geometric operation. The calculation method is various and can be set as required, and following example is given for explanation:

In the present embodiment, the viewshed is a trapezoid region, the blind zone is a triangle region, and the setting parameters include: horizontal viewing angle, vertical viewing angle, angle of depression T and horizontal angle P; four vertexes of the trapezoid region are indicated as d2, d3, d5 and d6, the triangle region is a region comprised of M, d2 and d3, and M is the location where the pole of the camera is located. FIG. 4 is an actual location chart for a camera to acquire video data in the present embodiment. FIG. 5 is a flowchart of calculating location coordinates of a viewshed in the present embodiment, which comprises following steps:

In step 501, heights of the triangle and the trapezoid are calculated from the angle of depression, the vertical viewing angle and the pole height.

1) height of the triangle:

angle a is first calculated: angle a=90−angle of depression−half of vertical viewing angle; as shown in the figure, the angle of depression is an angle between ground and bisector of the vertical viewing angle;

then the height of the triangle is calculated: height of the triangle=pole height*tan a.

2) height of the trapezoid:

angle b is first calculated: angle b=angle of depression−half of vertical viewing angle;

then the height of the trapezoid is calculated: height of the trapezoid=(pole height*c tan b)−height of the triangle.

Then proceeds to step 502, r1, r2 are calculated from the height of the triangle, the height of the trapezoid and the horizontal viewing angle, wherein r1, r2 are respectively half lengths of upper base and lower base of the trapezoid.

r1=height of the triangle*tan (half of horizontal viewing angle);

r2=(height of the triangle+height of the trapezoid)*tan (half of horizontal viewing angle);

Then proceeds to step 503, taking bisector of the horizontal viewing angle as x axis, coordinates of d1 are calculated from the information of camera point location and the height of the triangle, wherein d1 is a crossing point of the bisector of the horizontal viewing angle and the upper base of the trapezoid; coordinates of two vertexes d2 and d3 of the upper base of the trapezoid are calculated from d1 and the horizontal viewing angle; the coordinates of two vertexes d2 and d3 are transformed to the coordinates with the horizontal angle P toward upward.

In FIG. 5, d1 and d4 are respectively crossing points of the bisector of the horizontal viewing angle and two parallel bases of the trapezoid. The information of camera point location (mapPoint) is known, and the information of camera point location includes horizontal coordinate mapPoint.x and vertical coordinate mapPoint.y of the camera. Coordinates of d1 are first calculated, wherein the horizontal coordinate of d1 is indicated as d1.x, the vertical coordinate of d1 is indicated as d1.y:

d1.x=mapPoint.x+height of the triangle;
d1.y=mapPoint.y.

After d1 is calculated, coordinates of d2, d3 can be calculated from a triangle formula. The obtained d2 and d3 now are calculated with the bisector of the horizontal viewing angle as x axis. And the camera is provided with a 0-degree angle, and current orientation of the camera with respect to the 0-degree angle is the horizontal angle; thus, coordinates of d2 and d3 are required to be transformed to the coordinates with the horizontal angle P toward upward, and this transformation is a geometric coordinate transformation which is easily implemented by those skilled in the art and is not repeated here.

Then proceeds to step 504, coordinates of d4 are calculated from the information of camera point location, the height of the triangle and the height of the trapezoid, wherein d4 is a crossing point of the bisector of the horizontal viewing angle and the lower base of the trapezoid; coordinates of two vertexes d5 and d6 of the lower base of the trapezoid are calculated from d4 and the horizontal viewing angle; the coordinates of two vertexes d5 and d6 are transformed to the coordinates with the horizontal angle P toward upward.

Similar to the method for calculating coordinates of d2 and d3 in the step 503, coordinates of d4 can be calculated from mapPoint, the height of the triangle and the height of the trapezoid, and then coordinates of d5, d6 can be calculated from a triangle formula, which will not be repeated here.

Afterwards, a blind zone and a viewshed can be generated on an electronic map, which specifically comprises:

A. a triangle region (the blind zone) is generated:

a triangle region is generated by combining the information of camera point location, the points d2 and d3.

B. a trapezoid region (the viewshed) is generated:

a trapezoid region is generated by combining the points d2, d3, d5 and d6.

C. finally, the triangle region and the trapezoid region are combined and loaded onto the electronic map.

Figure 6:
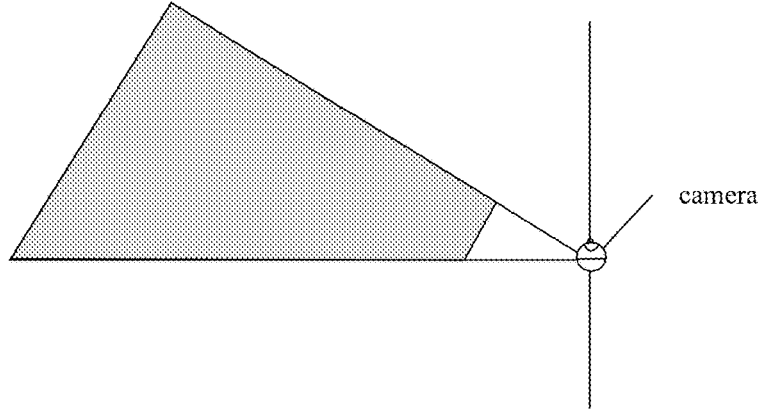
FIG. 6 illustrates schematic example I of displaying a lens viewshed of a camera in the third embodiment of the present disclosure.

FIG. 6 illustrates a schematic example of displaying a viewshed of a camera. In this figure, the camera is displayed on the actual location of the electronic map, wherein the white triangle portion is the blind zone, and the grey trapezoid portion is the viewshed.

After the generated blind zone and the generated viewshed are performed an overlapping display on the electronic map, the setting parameters can further be adjusted to implement controlling the camera, which specifically comprises:

parameter adjustment information containing a variation value is received;

an adjustment parameter is determined from the parameter adjustment information, and is transmitted to the camera so as to make adjustment according to the adjustment parameter; and the obtained setting parameters are updated according to the adjustment parameter, and it returns to perform the step 302 in the flow of FIG. 3, so as to simultaneously adjust the blind zone and the viewshed on the electronic map.

The parameter adjustment information can be set as required, such as containing zoom size after adjustment; correspondingly, the adjustment parameter being determined from the parameter adjustment information comprises: the horizontal viewing angle and the vertical viewing angle are obtained from a zoom size transformation, and the obtained horizontal viewing angle and the obtained vertical viewing angle are taken as the adjustment parameters. The zoom size determines values of the horizontal viewing angle and the vertical viewing angle, and after the zoom size is determined, the horizontal viewing angle and the vertical viewing angle can be calculated in combination with some setting parameters, the combined setting parameters including focal length of the camera, horizontal width and horizontal height of image sensor (CCD, Charge-coupled Device) in the camera; this calculation is prior art which is not repeated here.

As another example, the parameter adjustment information contains horizontal rotation angle of the camera; the adjustment parameter being determined from the parameter adjustment information comprises: corresponding horizontal angle is calculated from the horizontal rotation angle of the camera, and the calculated horizontal angle is taken as the adjustment parameter. Specifically, assuming due east direction is 0-degree angle and clockwise direction is positive direction, current horizontal angle is 90 degrees which is toward due south direction, the parameter adjustment information contains rotating the camera clockwise by 90 degrees in the horizontal direction, and the calculated horizontal angle is 180 degrees.

Figure 7:
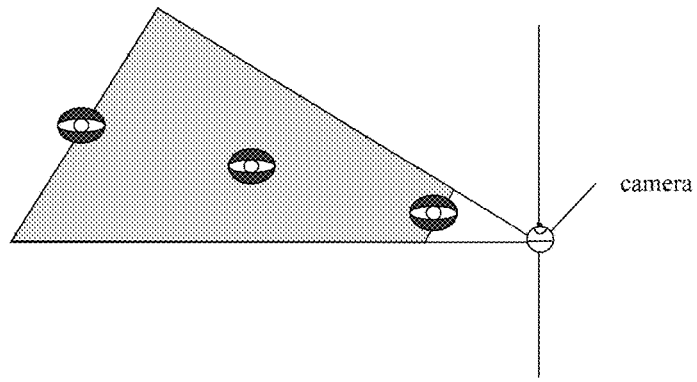
FIG. 7 illustrates schematic example II of displaying a lens viewshed of a camera in the third embodiment of the present disclosure.

FIG. 7 illustrates three eye buttons, and a user can operate respective eye buttons to implement adjusting the setting parameters of the camera; the rightmost eye button is zoom size adjustment button, such as the zoom size can be increased by dragging the zoom size adjustment button to the left, and the zoom size can be decreased by dragging the zoom size adjustment button to the right; the middle eye button is horizontal angle adjustment button, and the user can rotate this eye button clockwise or counterclockwise; the leftmost eye button is vertical direction adjustment button, and the user can drag this eye button up or down, so as to rotate the camera in the vertical direction.

In the present disclosure, setting parameters are obtained from a camera, location coordinates of a viewshed in the horizontal direction of the camera are calculated based on the setting parameters, and a trapezoid region is generated by combining the location coordinates of the viewshed; then, the generated trapezoid region is performed an overlapping display on an electronic map. Utilizing the solution of the present disclosure not only can display the location of the camera on the electronic map, but also can simultaneously display the viewshed of the camera on the map, so that the viewshed of the camera is visually displayed on the map without need to view corresponding video data at the surveillance client, which simplifies operations, enriches information of the electronic map, and further satisfies requirements.

In addition, utilizing the solution of the present disclosure to operate on the electronic map can remotely control the camera without need to adjust the camera parameters on the spot, which simplifies operations.

Figure 8:
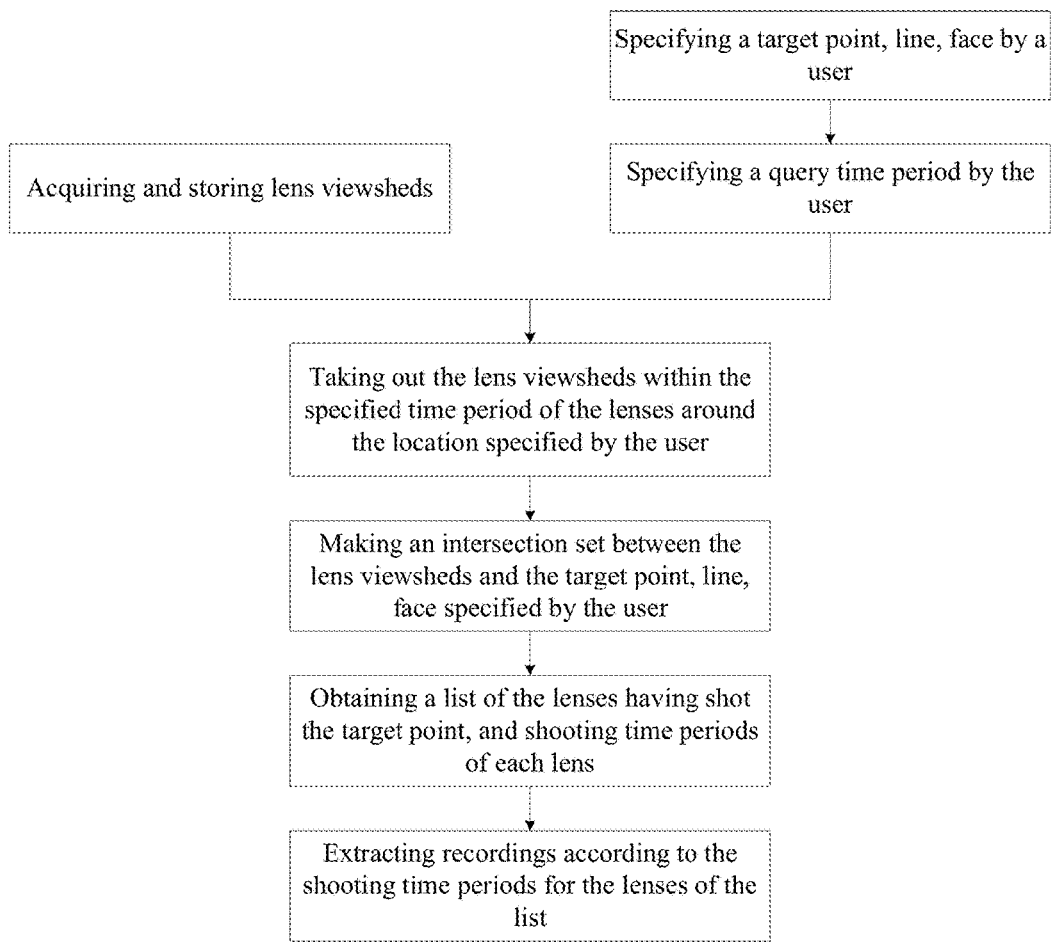
FIG. 8 is a flowchart of a method for extracting surveillance recording videos in the fourth embodiment of the present disclosure.

The fourth embodiment of the present disclosure relates to a method for extracting surveillance recording videos. FIG. 8 is a flowchart of the method for extracting surveillance recording videos.

The present solution is based on lens viewsheds, and when a user obtains some seeking information, such as location information of where the suspect has appeared, escape route, hiding region, and requires to seek recording clips in which the suspect appears in the video system, information of whether a lens has shot these regions within the specified time period is obtained by making an intersection set between the viewshed and the criminal site, the escape route or the criminal region set by the user, so that recordings are directly extracted for the lenses, which saves a lot of time spent by viewing cameras one by one to perform artificial checking. Wherein, video system refers to software system which manages a large number of lenses, stores and forwards videos for the lenses and provides the user with functions such as lens real-time surveillance, recording playback and PTZ control etc. PTZ control refers to operations such as rotating the dome camera toward up, down, left and right, and controlling the lens focal length.

Specifically, as shown in FIG. 8, a general flow of the method for extracting surveillance recording videos is: lens viewsheds are acquired and stored; a query condition is specified by a user; the viewsheds are sought and videos are extracted.

1) lens viewsheds are acquired and stored

Figure 9:
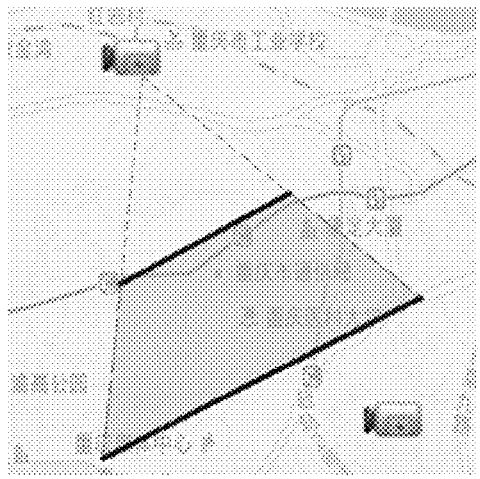
FIG. 9 is a schematic diagram of displaying a lens viewshed on the GIS map in the fourth embodiment of the present disclosure.

An viewshed shown in FIG. 9 can be obtained on the GIS map by acquiring and modeling viewsheds of lenses.

Directional information for respective time periods of a large number of lenses are stored in the video system, and viewshed state at any time point of any lens can be restored according to these information.

Figure 10:
FIG. 10 is a schematic diagram of calibrating a target location on the GIS map in the fourth embodiment of the present disclosure.
Figure 11:
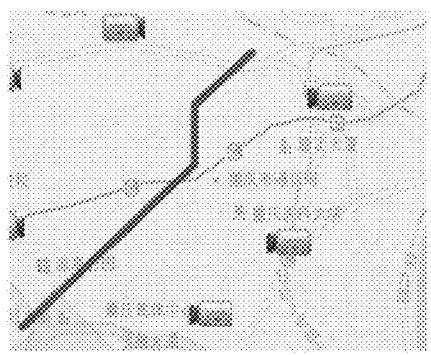
FIG. 11 is a schematic diagram of calibrating a target location on the GIS map in the fourth embodiment of the present disclosure.
Figure 12:
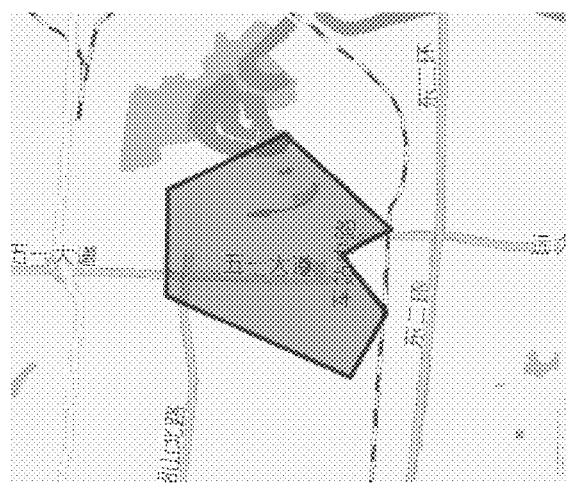
FIG. 12 is a schematic diagram of calibrating a target location on the GIS map in the fourth embodiment of the present disclosure.
Figure 13:
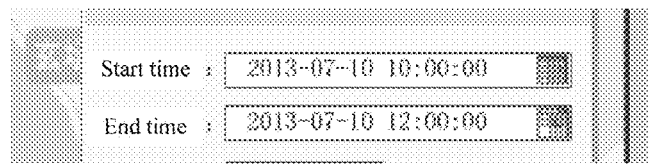
FIG. 13 is a schematic diagram of specifying a query time period in the fourth embodiment of the present disclosure.

2) a query condition is specified by a user:

On the GIS map, a user can calibrate a point (as shown in FIG. 10), or a line (as shown in FIG. 11), or a region (as shown in FIG. 12), and then specify a time period, such as 10:00~12:00 on Jul. 10, 2013 as shown in FIG. 13.

3) the viewsheds are sought

The viewsheds within the specified time period (i.e. the query time period) of the lenses within a certain range around the query location are taken out, and are made an intersection set (i.e. an intersection relation is calculated) with the point, the line or the region specified by the user: if the lens viewshed is intersected with the point, the line or the region specified by the user within this time period, the lens has shot the location specified by the user (i.e. the target location). A lens list (i.e. an intersection set of cameras) and sub time periods (i.e. the shooting time periods corresponding to the viewsheds) are obtained after calculation, such as:

lens 1—10: 35: 00~10: 41: 00 and 11: 21: 06~11: 34: 56
lens 2—10: 00: 00~11: 30: 00
lens 3 . . .

Figure 14:
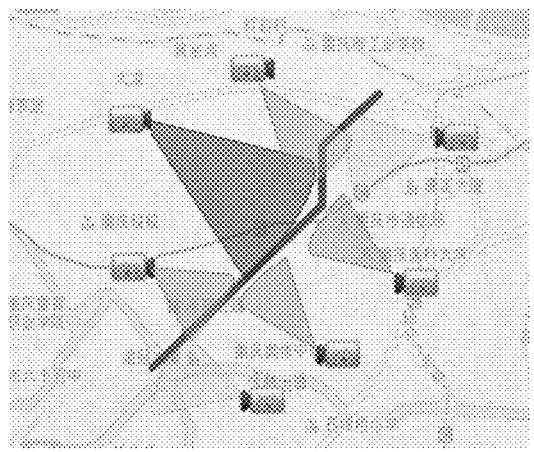
FIG. 14 is a schematic diagram of showing a set of cameras on the GIS map in the fourth embodiment of the present disclosure.
Figure 15:
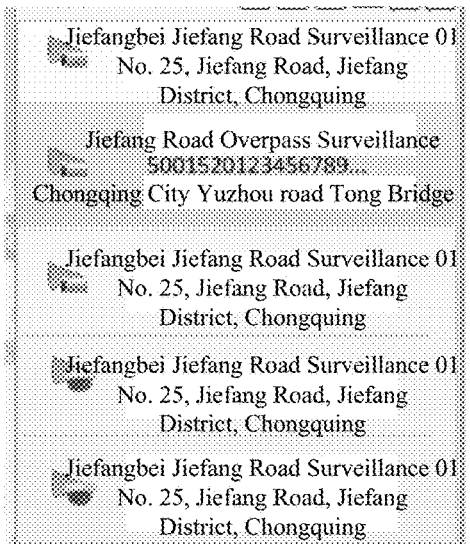
FIG. 15 is a list of the set of cameras in the fourth embodiment of the present disclosure.

They are indicated on the GIS as shown in FIG. 14. The lens list obtained at same time is shown in FIG. 15. Calculating the intersection set between the viewshed and the target point (or the line or the region) specified by the user utilizes spatial calculation ability of the GIS engine, two graphic objects are input to the GIS engine and then the GIS engine returns whether these two graphs have an intersection.

In addition to finding out the lenses having shot the target point (or the line or the region) through calculation, more accurate time clips in which these lenses shot the target point are further determined (because a lens is often rotated by human, there may be sights of many shorter time clips on the set target within the specified time period). This makes extracted recordings fewer and the recording time length required to be artificially processed shorter, which alleviates the working pressure of the staff.

To avoid the calculation speed being too slow when the lenses are too many, the lens viewsheds within a certain range around the target point (or the line or the region) can be taken out to perform calculation, so that most of the lenses in the system are avoided. Meanwhile, performing a viewshed intersection calculation for the lenses around the target point can exclude a large number of lenses and only take out a small part of lenses for calculation, so that the amount of calculation is greatly reduced and the response speed is faster.

4) videos are extracted

After the lens list and the shooting time periods are obtained, a recording extraction request can be transmitted directly to the video system, so that video files of corresponding time periods of these lenses are obtained.

Now intelligent video analysis algorithm still does not have breakthrough in the real sense and can not perform machine identification, and in the using method of traditional video surveillance, it needs to view a lot of long time periods videos which from the lens that around a criminal site artificially after an event occurs, so as to determine which lenses having shot the criminal region, the criminal site or the walking route of the suspect. In the urban areas where video lenses are very dense, it often spends a lot of manpower and time costs. The method for extracting recordings of the present disclosure may help a user to save a lot of time for screening lenses, and directly extract recordings matching a condition, which greatly reduces the recordings to be artificially checked and improves the working efficiency of the investigators. Powerful calculation ability of a computer can be utilized to participate in recording screening.

The method embodiments of the present disclosure all can be realized by software, hardware and firmware etc. Regardless of the present disclosure is realized by software, or hardware, or firmware, the instruction codes can be stored in any type of computer accessible memory (such as permanent or modifiable, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 16:
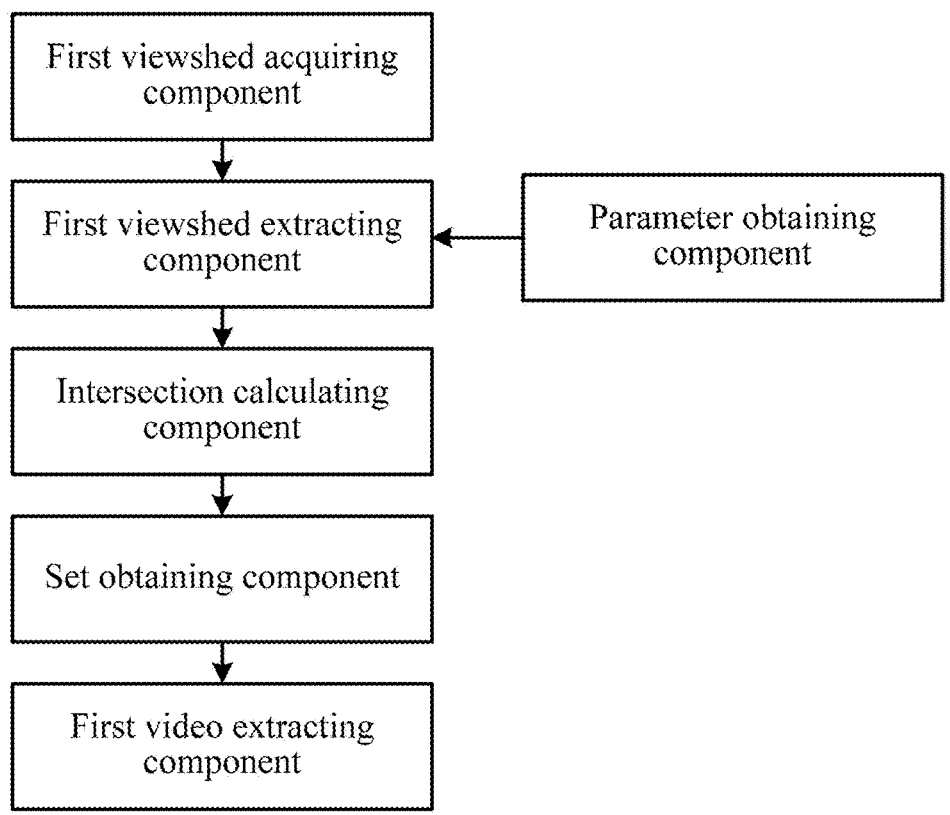
FIG. 16 is a schematic diagram of an apparatus for extracting surveillance recording videos in the fifth embodiment of the present disclosure.

The fifth embodiment of the present disclosure relates to an apparatus for extracting surveillance recording videos. FIG. 16 is a schematic diagram of the apparatus for extracting surveillance recording videos.

Specifically, as shown in FIG. 16, the apparatus for extracting surveillance recording videos comprises following components:

a first viewshed acquiring component configured to acquire and store lens viewsheds of cameras and shooting time periods corresponding to each lens viewshed.

a first viewshed extracting component configured to extract the lens viewsheds corresponding to the shooting time periods which have intersection relations with a query time period.

an intersection calculating component configured to calculate an intersection relation between the extracted lens viewsheds and a target location.

a set obtaining component configured to obtain a set of cameras corresponding to the lens viewsheds which have intersection relations with the target location.

a first video extracting component configured to extract videos shot by cameras according to the shooting time periods of respective cameras in the set of cameras.

In the present embodiment, the apparatus further comprises following component:

a parameter obtaining component configured to obtain the query time period and the target location from an input device.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

Figure 17:
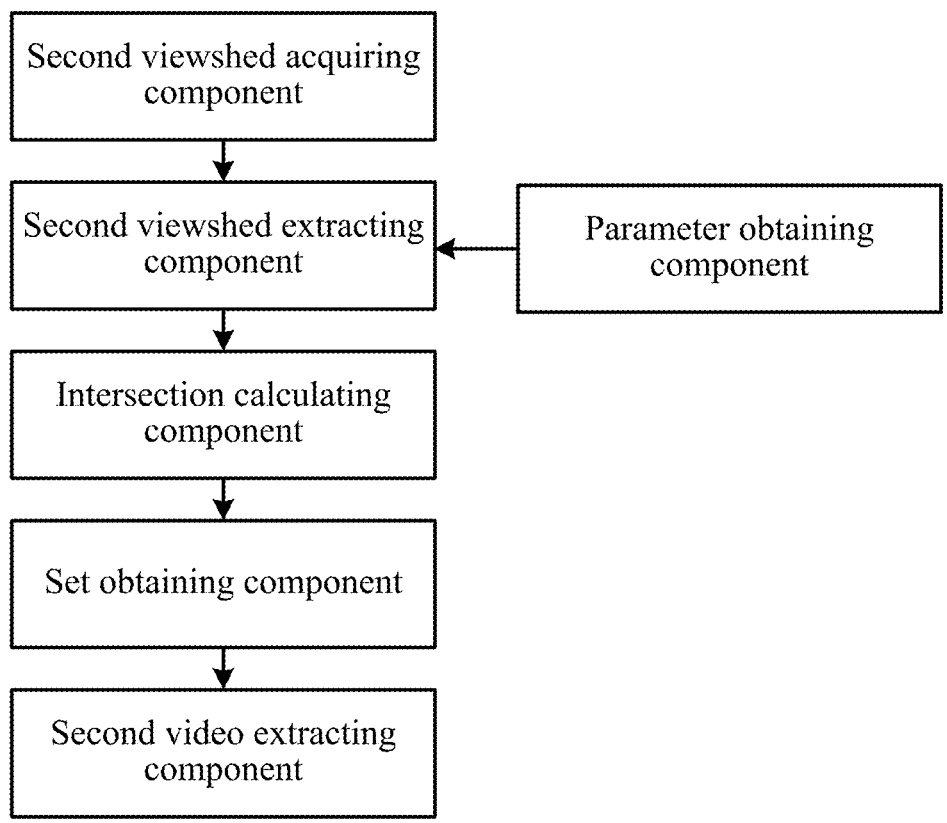
FIG. 17 is a schematic diagram of an apparatus for extracting surveillance recording videos in the sixth embodiment of the present disclosure.

The sixth embodiment of the present disclosure relates to an apparatus for extracting surveillance recording videos. FIG. 17 is a schematic diagram of the apparatus for extracting surveillance recording videos.

Specifically, as shown in FIG. 17, the apparatus for extracting surveillance recording videos comprises:

a second viewshed acquiring component configured to acquire and store lens viewsheds of cameras.

a parameter obtaining component configured to obtain a query time period and a target location from an input device.

a second viewshed extracting component configured to extract lens viewsheds of respective cameras within the query time period.

an intersection calculating component configured to calculate intersection relations between the extracted lens viewsheds and the target location.

a set obtaining component configured to obtain a set of cameras corresponding to the lens viewsheds which have intersection relations with the target location.

a second video extracting component configured to extract videos shot within the query time period by respective cameras in the set of cameras.

In the present embodiment, the acquired and stored lens viewshed refers to all regions which can be shot by a camera corresponding to the lens viewshed within a variable range of the camera.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

It should be noted that components disclosed in each apparatus embodiment of the present disclosure are logical components, on the physical, a logic component can be a physical component, and may be part of a physical component, or implemented in combination of several physical components, and physical implementing methods for these logic components themselves are not the most important, the combination of the functions achieved by these logic components is the key to solving the technical problem disclosed in the present disclosure. Furthermore, in order to highlight innovative part of the present disclosure, the above apparatus embodiments of the present disclosure do not introduce the components which are not related closely to solving the technical problem disclosed in the present disclosure, which does not indicate that the above apparatus embodiments do not include other components.

It should be explained that in the Claims and Description of the present disclosure, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to certain preferred embodiments of the present disclosure, the present disclosure has been shown and described. But it should be understood to those skilled in the art that various other changes in the forms and details may be made without departing from the principles and scope of the disclosure.

What is claimed:

1. A method for extracting surveillance recording videos, wherein the method comprises following steps:

acquiring and storing lens viewsheds of cameras and shooting time periods corresponding to each lens viewshed;

extracting the lens viewsheds corresponding to the shooting time periods which have intersection relations with a query time period;

calculating intersection relations between the extracted lens viewsheds and a target location;

obtaining a set of cameras corresponding to the lens viewsheds which have intersection relations with the target location;

extracting videos shot by cameras according to the shooting time periods of respective cameras in the set of cameras.

2. A method for extracting surveillance recording videos, wherein the method comprises following steps:

extracting lens viewsheds of respective cameras within a query time period;

calculating intersection relations between the extracted lens viewsheds and a target location;

obtaining a set of cameras corresponding to the lens viewsheds which have intersection relations with the target location;

extracting videos shot within the query time period by respective cameras in the set of cameras.

3. The method for extracting surveillance recording videos according to claim 2, wherein before the step of extracting lens viewsheds of respective cameras within a query time period, it further comprises following step:

acquiring and storing lens viewsheds of cameras.

4. The method for extracting surveillance recording videos according to claim 3, wherein the acquired and stored lens viewshed includes all regions which can be shot by a camera corresponding to the lens viewshed within a variable range of the camera.

5. The method for extracting surveillance recording videos according to claim 2, wherein in the step of calculating intersection relations between the extracted lens viewsheds and a target location, calculating intersection relations is implemented by inputting two graphic objects to an engine of a geographic information system, utilizing spatial calculation ability of the engine and then returning an intersection result of these two graphs by the engine.

6. The method for extracting surveillance recording videos according to claim 2, wherein before the step of extracting lens viewsheds of respective cameras within a query time period, it further comprises following step:

obtaining the query time period and the target location from an input device.

7. An apparatus for extracting surveillance recording videos, wherein the apparatus comprising:

a processor and a memory having computer-readable instructions that when executed by the processor performs a method, including:

acquiring and storing lens viewsheds of cameras and shooting time periods corresponding to each lens viewshed;

extracting the lens viewsheds corresponding to the shooting time periods which have intersection relations with a query time period;

calculating intersection relations between the extracted lens viewsheds and a target location;

obtaining a set of cameras corresponding to the lens viewsheds which have intersection relations with the target location;

extracting videos shot by cameras according to the shooting time periods of respective cameras in the set of cameras.

8. An apparatus for extracting surveillance recording videos, wherein the apparatus comprising:

a processor and a memory having computer-readable instructions that when executed by the processor performs a method, including:

extracting lens viewsheds of respective cameras within a query time period;

calculating intersection relations between the extracted lens viewsheds and a target location;

obtaining a set of cameras corresponding to the lens viewsheds which have intersection relations with the target location;

extracting videos shot within the query time period by respective cameras in the set of cameras.

9. The apparatus for extracting surveillance recording videos according to claim 8, wherein the processor further acquires and stores lens viewsheds of cameras and obtains the query time period and the target location from an input device.

10. The apparatus for extracting surveillance recording videos according to claim 9, wherein the acquired and stored lens viewshed includes all regions which can be shot by a camera corresponding to the lens viewshed within a variable range of the camera.

* * * * *